(12) United States Patent
Tsuboi (10) Patent No.: US 12,518,571 B2
(45) Date of Patent: Jan. 6, 2026

(54) PROCESSING SYSTEM, PROCESSING METHOD, AND COMPUTER READABLE MEDIUM STORING PROCESSING PROGRAM

(71) Applicant: DENSO CORPORATION, Kariya (JP)

(72) Inventor: Soichiro Tsuboi, Kariya (JP)

(73) Assignee: DENSO CORPORATION, Kariya (JP)

( * ) Notice: Subject to any disclaimer, the term of this patent is extended or adjusted under 35 U.S.C. 154(b) by 814 days.

(21) Appl. No.: 17/749,285

(22) Filed: May 20, 2022

(65) Prior Publication Data

US 2022/0375276 A1 Nov. 24, 2022

(30) Foreign Application Priority Data

May 24, 2021 (JP) .................................. 2021-087192

(51) Int. Cl.
*G06F 9/50* (2006.01)
*G07C 5/00* (2006.01)
*G07C 5/08* (2006.01)

(52) U.S. Cl.
CPC ............. *G07C 5/008* (2013.01); *G06F 9/505* (2013.01); *G07C 5/0816* (2013.01); *G07C 5/0841* (2013.01)

(58) Field of Classification Search
CPC ......... G06F 1/329; G06F 9/505; G06F 9/5083
See application file for complete search history.

(56) References Cited

U.S. PATENT DOCUMENTS

| 11,858,372 B2 * | 1/2024 | Hauschild ........... G06F 11/3409 |
| 2011/0041136 A1 | 2/2011 | Messier et al. |
| 2020/0351410 A1 | 11/2020 | Guo |
| 2021/0316632 A1 | 10/2021 | Hauschild et al. |

FOREIGN PATENT DOCUMENTS

| JP | 2006-338264 | | 12/2006 |
| JP | 2019036017 | A | 3/2019 |
| JP | 2019175216 | A | 10/2019 |
| JP | 2021511718 | A | 5/2021 |
| JP | 2021533494 | A | 12/2021 |
| WO | WO-2019189682 | A1 | 10/2019 |
| WO | WO-2020030718 | A1 | 2/2020 |

\* cited by examiner

*Primary Examiner* — Andy Ho
(74) *Attorney, Agent, or Firm* — Harness, Dickey & Pierce, P.L.C.

(57) ABSTRACT

A processing system is in a host center configured to communicate with edge computers each of which is mounted on one of a plurality of moving bodies, and the processing system is configured to perform host processing on a service data set related to a cloud service. The processing system includes a processor configured to set divided data of the service data set, and search, for each of the divided data, the edge computer that satisfies a necessary condition required for performing distribution processing on the divided data by monitoring whether each of the edge computers satisfies the necessary condition.

8 Claims, 9 Drawing Sheets

| NECESSARY CONDITION Cd | | CONTENTS OF CONDITION |
|---|---|---|
| MAIN CONDITION Cd1 | | REQUIRED PROCESSING CAPACITY Ad IS AT OR BELOW PROCESSING CAPACITY Ae |
| SUB-CONDITION Cd2 | | MOTION STATE OF MOVING BODY IS STOP STATE |
| SUB-CONDITION Cd3 | ESSENTIAL CONDITION Cd3_a | POWER STATE OF MOVING BODY IS CHARGING STATE |
| | OPTIONAL CONDITION Cd3_b | REMAINING POWER IS WITHIN ACCEPTABLE RANGE |
| SUB-CONDITION Cd4 | | TIME ZONE OF MOVING BODY IS NIGHTTIME |
| SUB-CONDITION Cd5 | | TEMPERATURE STATE OF MOVING BODY IS WITHIN ACCEPTABLE RANGE |

PROCESSING SYSTEM, PROCESSING METHOD, AND COMPUTER READABLE MEDIUM STORING PROCESSING PROGRAM

CROSS REFERENCE TO RELATED APPLICATION

This application is based on and incorporates herein by reference Japanese Patent Application No. 2021-087192 filed on May 24, 2021.

TECHNICAL FIELD

The present disclosure relates to a technique for processing a service data set related to a cloud service.

BACKGROUND

In recent years, the number of service users who use cloud services through a communication network is increasing worldwide. In service centers that provide cloud services, as the number of such service users increases, computers for high-capacity processing are being installed in large facilities, and multiple cloud servers are built virtually according to various cloud services.

However, installing computers capable of processing large amounts of data requires a huge capital investment. This may lead to the monopoly or oligopoly of cloud services, which would inhibit the entry of newcomers and increase service fees in a seller's market, thereby hindering sustainable technological development and economic growth.

SUMMARY

A first aspect of the present disclosure is a processing system in a host center configured to communicate with edge computers each of which is mounted on one of a plurality of moving bodies, and the processing system is configured to perform host processing on a service data set related to a cloud service. The processing system includes a processor configured to set divided data of the service data set, and search, for each of the divided data, the edge computer that satisfies a necessary condition required for performing distribution processing on the divided data by monitoring whether each of the edge computers satisfies the necessary condition.

A second aspect of the present disclosure is a processing method for performing host processing on a service data set related to a cloud service in a host center configured to communicate with edge computers each of which is mounted on one of a plurality of moving bodies. The processing method includes setting divided data of the service data set, and searching, for each of the divided data, the edge computer that satisfies a necessary condition required for performing distribution processing on the divided data by monitoring whether each of the edge computers satisfies the necessary condition.

A third aspect of the present disclosure is a non-transitory computer readable medium storing a computer program product for performing host processing on a service data set related to a cloud service in a host center configured to communicate with edge computers each of which is mounted on one of a plurality of moving bodies. the computer program product includes instructions configured to, when executed by at least one processor, cause the at least one processor to set divided data of the service data set, and search, for each of the divided data, the edge computer that satisfies a necessary condition required for performing distribution processing on the divided data by monitoring whether each of the edge computers satisfies the necessary condition.

DETAILED DESCRIPTION

Hereinafter, an embodiment of the present disclosure will be described with reference to the drawings.

Figure 1:
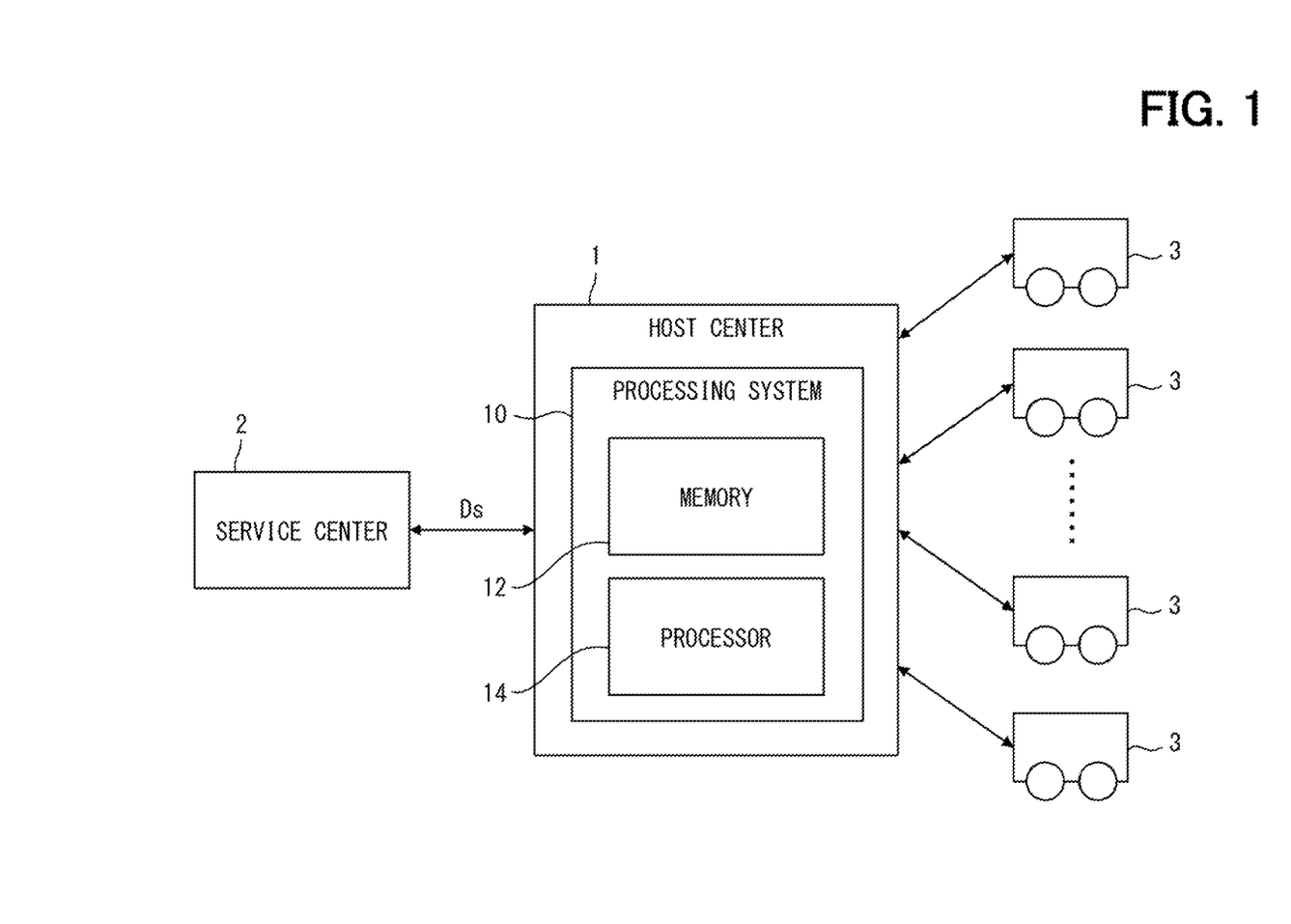
FIG. 1 is a block diagram showing an overall configuration of a communication network according to an embodiment.

A host center 1 of an embodiment shown in FIG. 1 incudes a gateway server, a communication router, and the like to perform host processing on service data set Ds related to a cloud service. The host center 1 is communicatively connected to at least one service center 2 and multiple moving bodies 3 via at least one of wired communication line and wireless communication line. A communication network in which TCP (Transmission Control Protocol), UDP (User Datagram Protocol) or the like is used is formed between the host center 1 and at least one service center 2, and between the host center 1 and the moving bodies 3. As a result, the host center 1 functions as a gateway between at least one service center 2 and each moving body 3. In the following description, the present embodiment will be described with an example where the communication network is formed between the host center 1 and one service center 2.

The service center 2 includes a cloud server, a communication router and the like. Service Center 2 is managed by a service provider that is in the business of providing cloud services to service users. The service provided by the service center 2 includes, for example, at least one of urban planning services, road maintenance services, map information services, operation management services, traffic management services, parking management services, battery management services, logistics services, communication services, financial services, trading services, rental services, temporary staffing services, agency services, security services, building management services, cleaning services, insurance services, travel services, reservation services, food and beverage services, amusement services, distribution services, game services, medical services, educational services, childcare services, academic services, seminar services, management services, and legal services.

The service center 2 is configured to generate service data set Ds on which the host processing is performed at the host center 1. Service data set Ds is variable volume digital data required for the cloud services provided by the service center 2. The service data set Ds includes at least one of image data, audio data, text data, job data, program data, and the like. The service data set Ds may be encrypted by the service center 2 and decrypted by the host center 1. In this case, the service data set is secure data.

Figure 2:
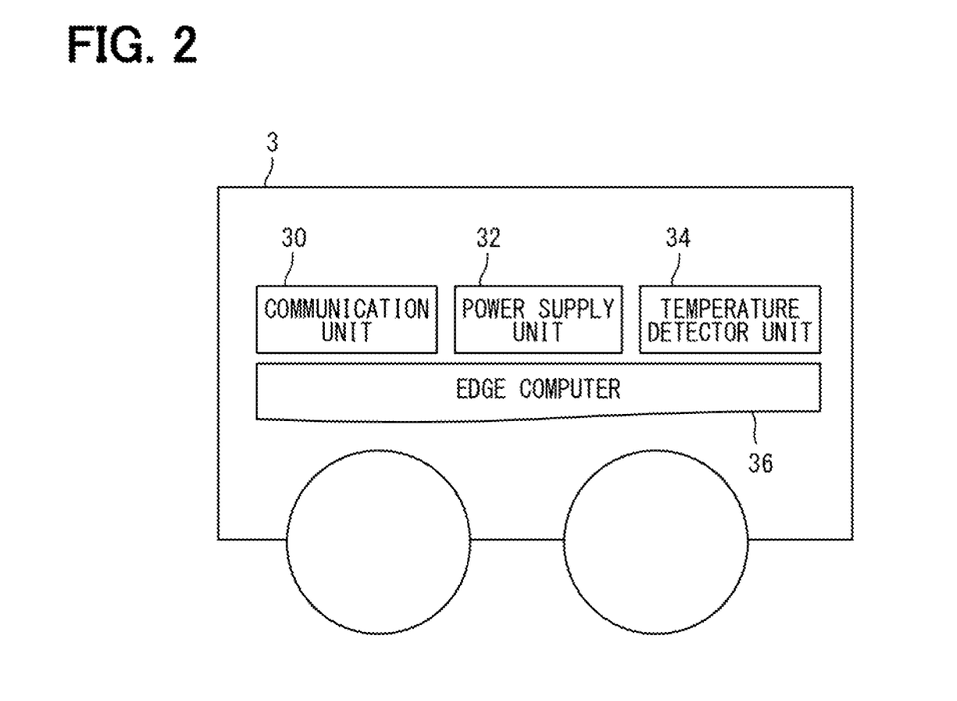
FIG. 2 is a block diagram showing a detailed configuration of a vehicle according to the embodiment.

Each moving body 3 is a vehicle pre-registered to the host center 1 and configured to travel on a road such as a car, a motorcycle, and a drone. Each moving body 3 has a communication unit 30, a power supply unit 32, a temperature detector unit 34, and an edge computer 36 as shown in FIG. 2. These components 30, 32, 34, 36 are configured to be operated both in an activated mode in which an activation switch of the moving body 3 is turned on and in a standby mode in which the activation switch is turned off.

The communication unit 30 of the moving body 3 includes at least one of DSRC (Dedicated Short Range Communications) unit, cellular V2X (C-V2X) communication unit, and the like which forms V2X system and is configured to communicate data by wireless communication with an outside. The communication unit 30 includes a GNSS (Global Navigation Satellite System) receiver, for example, configured to receive location data from an artificial satellite of GNSS.

The power supply unit 32 of the moving body 3 includes at least one storage battery such as a lithium-ion battery, a nickel-hydrogen battery, a solid-state battery, and a lead-acid battery. The power supply unit 32 stores power by receiving internal power generation during the active mode of the moving body 3. The power supply unit 32 may store electric power by being charged while the moving body 3 stops. The power supply unit 32 is configured to supply power for the moving body 3 by discharging to the electrical components of the moving body 3.

The temperature detector unit 34 of the moving body 3 has a temperature sensor such as a thermistor. In the moving body 3, the temperature detector unit 34 may detect the temperature of the electric components including at least one of the edge computer 36 and the power supply unit 32, or the ambient temperature of the electric components. The temperature detector unit 34 may be configured to detect an outside temperature outside the moving body 3.

The edge computer 36 is a dedicated computer mounted on the moving body 3. At least one edge computer 36 is mounted on the moving body 3. When the moving body 3 is a car, the edge computer 36 is generally called an in-vehicle computer. The edge computer 36 may be a driving control ECU (Electronic Control Unit) configured to control at least one of the automated driving or the manual driving of the moving body 3. The edge computer 36 may be a navigation ECU for navigating the traveling path of the moving body 3. The edge computer 36 may be a locator ECU for estimating state quantities of the moving body 3 including the position of the moving body 3. The edge computer 36 may be an energy ECU configured to perform at least one of the power supply management and the temperature management as the energy management in the moving body 3. The edge computer 36 may be an HCU (HMI (Human Machine Interface) Control Unit) configured to control information presentation in the moving body 3.

The edge computer 36 has at least one memory and at least one processor. The memory of the edge computer 36 is at least one type of non-transitory tangible storage medium, such as a semiconductor memory, a magnetic storage medium, and an optical storage medium, for non-transitory storing or memorizing computer readable programs and data. The processor of the edge computer 36 includes, as a core, at least one type of, for example, a CPU (Central Processing Unit), a GPU (Graphics Processing Unit), an RISC (Reduced Instruction Set Computer) CPU, and so on.

The edge computer 36 is configured to, based on the data acquired by the communication unit 30, recognize the position including latitude and longitude where the moving body 3 exists, and the time in the area where the moving body 3 belongs. The edge computer 36 may be configured to recognize the time from the internal clock or a clock unit mounted on the moving body 3. The edge computer 36 is configured to recognize the power supply state of the moving body 3 based on the data acquired from the power supply unit 32. The recognized power supply state includes residual power of the power supply unit 32. When the power supply unit 32 is configured to be charged from the outside, the recognized power supply state includes a charging state. The edge computer 36 is configured to recognize the temperature state of the moving body 3 based on the data acquired from the temperature detector unit 34.

As shown in FIG. 1, the host center 1 includes a processing system 10 configured to perform the host processing on the service data set Ds related to the cloud service. The processing system 10 includes at least one dedicated computer. The dedicated computer of the processing system 10 has at least one memory 12 and at least one processor 14. The memory 12 is at least one type of non-transitory tangible storage medium, such as a semiconductor memory, a magnetic medium, and an optical medium, for non-transitory storage of computer readable programs and data. The processor 14 includes at least one of the CPU, GPU, and RISC-CPU as a core.

The processor 14 executes multiple instructions included in a processing program stored in the memory 12 as software. This allows the processing system 10 to build a number of functional blocks to carry out host processing for the service data set Ds. As described above, in the processing system 10, the functional blocks are built by causing the processor 14 to execute multiple instructions of the processing program stored in the memory 12 for performing the host processing. The functional blocks of the processing system 10 includes, as shown in FIG. 3, a dividing block 100, a searching block 110, and an integration block 120.

The flow of processing method of the host processing performed by the blocks 100, 110, 120 of the processing system 10 will be described with reference to FIG. 4. The processing flow is executed every processing cycle of the processing system 10. In the description of the processing flow, "S" means a plurality of steps executed by a plurality of instructions included in the processing program. In the description of the processing flow, acquiring data may mean acquiring data by the processing system 10 of the host center 1 from the service center 2 or the moving body 3 through the communication router. In the description of the processing flow, transmitting data may mean transmitting data by the processing system 10 of the host center 1 from the service center 2 or the moving body 3 through the communication router.

Figure 3:
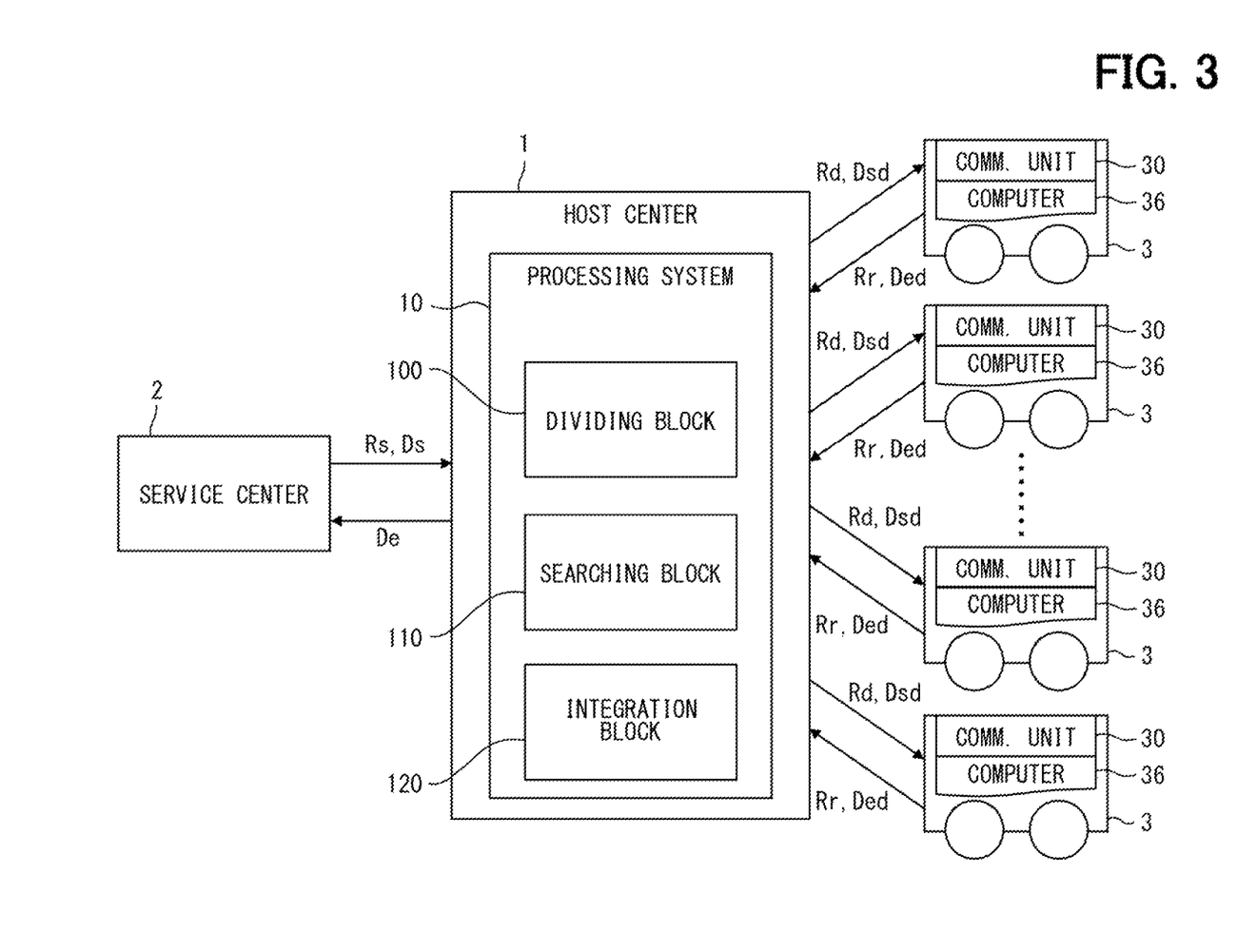
FIG. 3 is a block diagram of a functional configuration of a processing system according to the embodiment.
Figure 4:
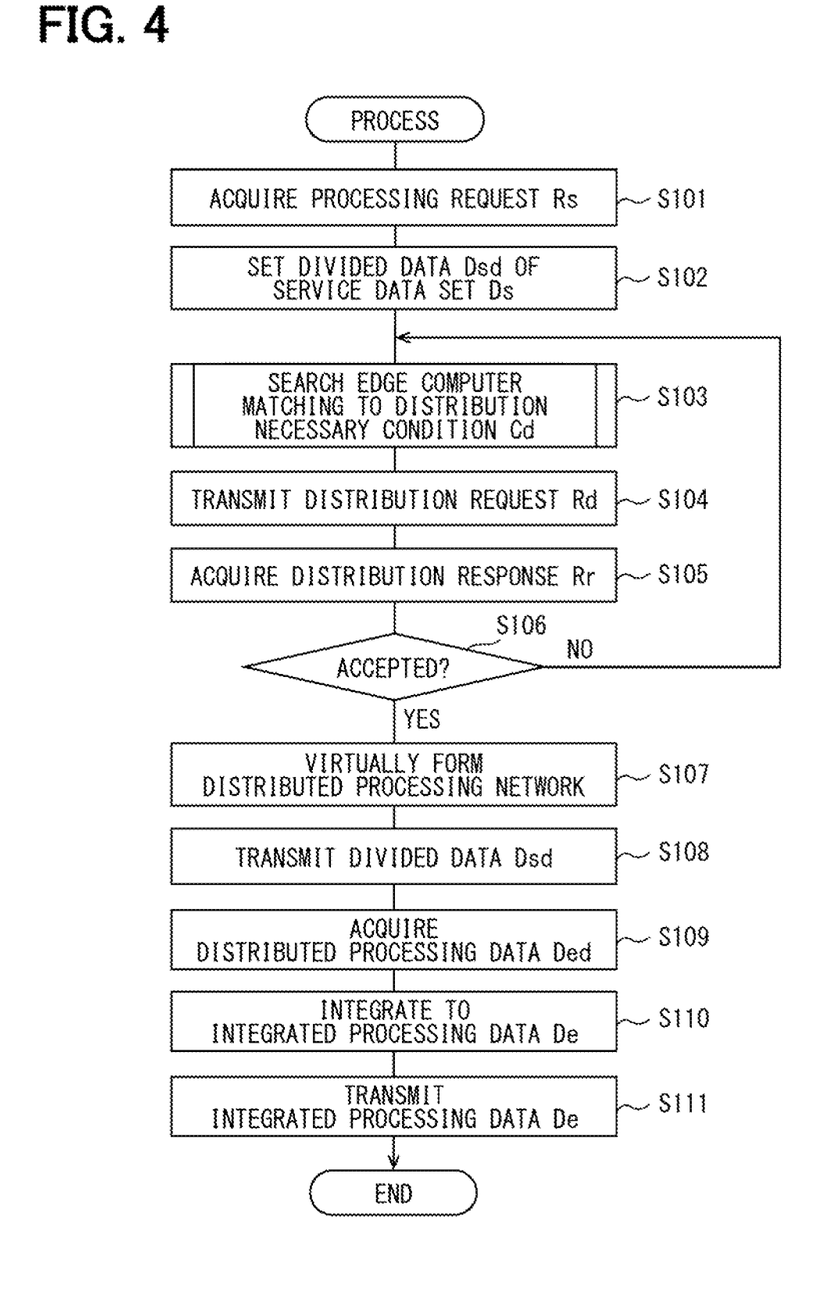
FIG. 4 is a flowchart illustrating a processing method according to the embodiment.

In S101 of the processing flow shown in FIG. 4, the dividing block 100 acquires a processing request Rs transmitted from the service center 2 as shown in FIG. 3. The processing request Rs is data such as a packet from the service center 2 for requesting the host center 1 to process the service data set Ds. The processing request Rs contains, as request information related to the service data set Ds, at least one of a data size, a data structure, a data type, a processing deadline, and the like. The processing request Rs may or may not contain the service data set Ds when S101 is performed. The processing request Rs is generated and transmitted by the service center 2 in response to the request from the service user of the cloud service, and acquired by the dividing block 100.

Figure 5:
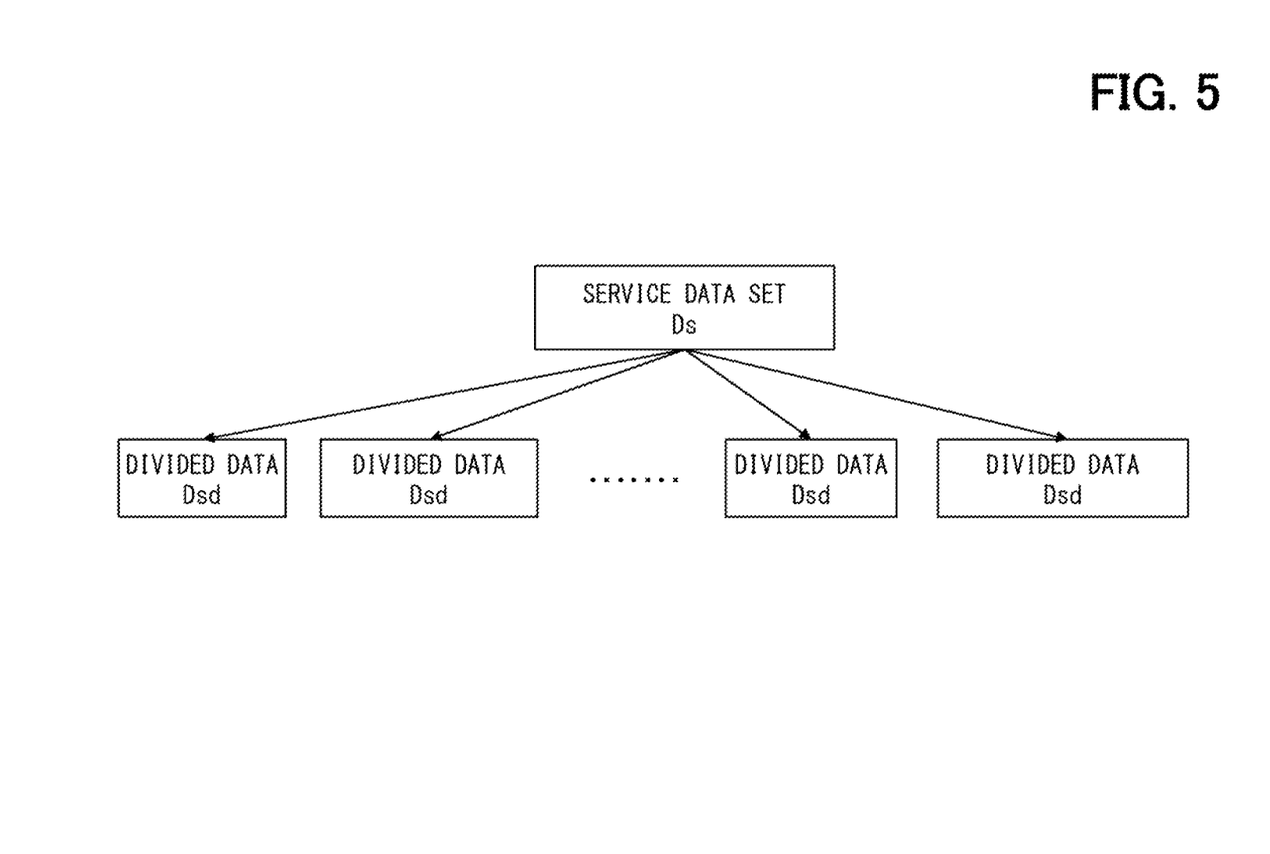
FIG. 5 is a schematic diagram for explaining divided data according to the embodiment.

In S102 of the processing flow shown in FIG. 4, the dividing block 100 sets divided data Dsd in response to the processing request Rs, which is divided data of the service data set Ds divided into multiple tasks that can be distributed and processed, as shown in FIG. 5. Specifically, the dividing block 100 determines the division of each divided data Dsd based on the data structure and the like of the request information contained in the processing request Rs. When the service data set Ds is contained in the processing request Rs, the service data set Ds is divided into the divided data Dsd according to the determined division. In contrast, when the service data set Ds is not contained in the processing request Rs, the service data set Ds acquired from the service center 2 in S102 may be divided into multiple divided data Dsd. Alternatively, when the service data set Ds is not contained in the processing request Rs, the division may be just determined as the setting of the divided data Dsd. However, when the division is just determined as the setting of the divided data Dsd, it is necessary to acquire the service data set Ds from the service center 2 and divide the service data set Ds into the multiple divided data Dsd according to the division until the following S108.

Figure 8:
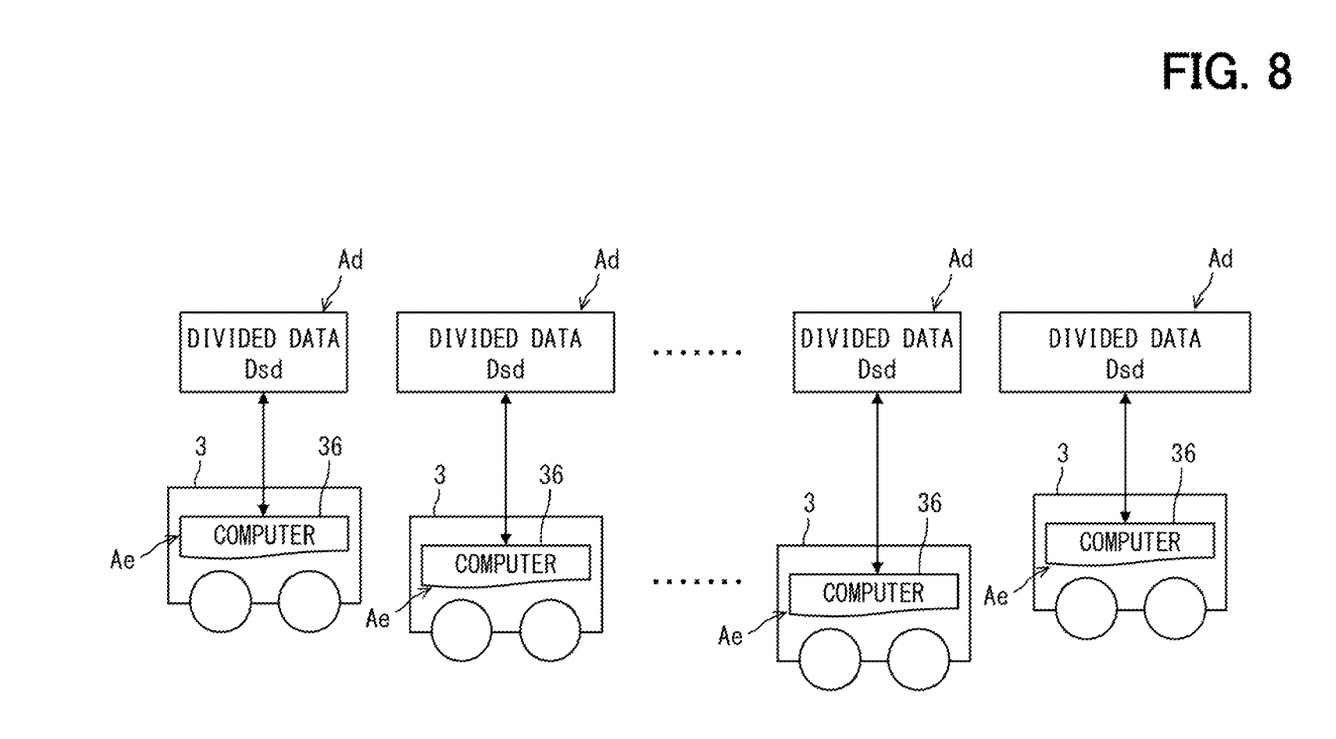
FIG. 8 is a schematic diagram for explaining the searching subroutine according to the embodiment.

As a part of setting up each divided data Dsd, the dividing block 100 in S102 estimates the required processing capacity Ad required for distributed processing of each of those data Dsd, as shown in FIG. 8. The required processing capacity Ad is estimated based on the data size and the processing deadline of the request information contained in the processing request Rs. As a result, the required processing capacity Ad including at least one of the data size, the required processing speed, and the required communication speed is estimated for each divided data Dsd.

Figure 6:
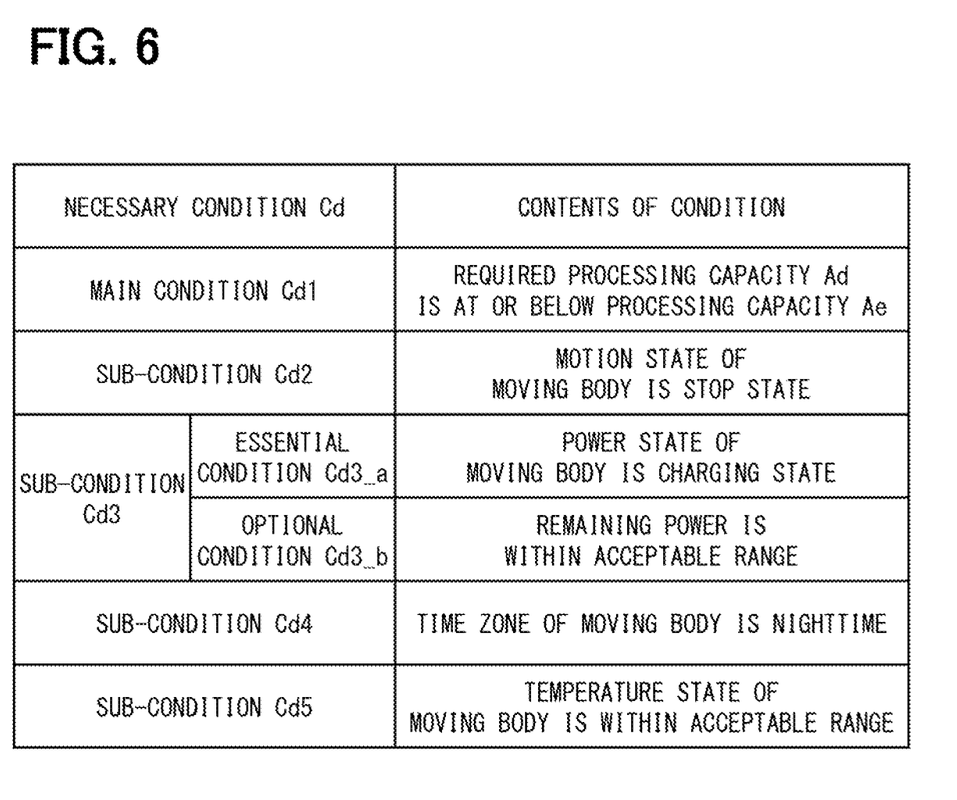
FIG. 6 is a table showing necessary conditions according to the embodiment.

As shown in FIG. 4, in S103 of the processing flow, the searching block 110 monitors the edge computer 36 of each moving body 3 for the matching of the distribution necessary conditions Cd required to establish the distributed processing for each divided data Dsd. As a result, the searching block 110 searches the edge computer 36 satisfying the distribution necessary conditions Cd for each divided data Dsd. As shown in FIG. 6, the distribution necessary condition Cd includes a main condition Cd1, and sub-conditions Cd2, Cd3, Cd4, Cd5.

Figure 7:
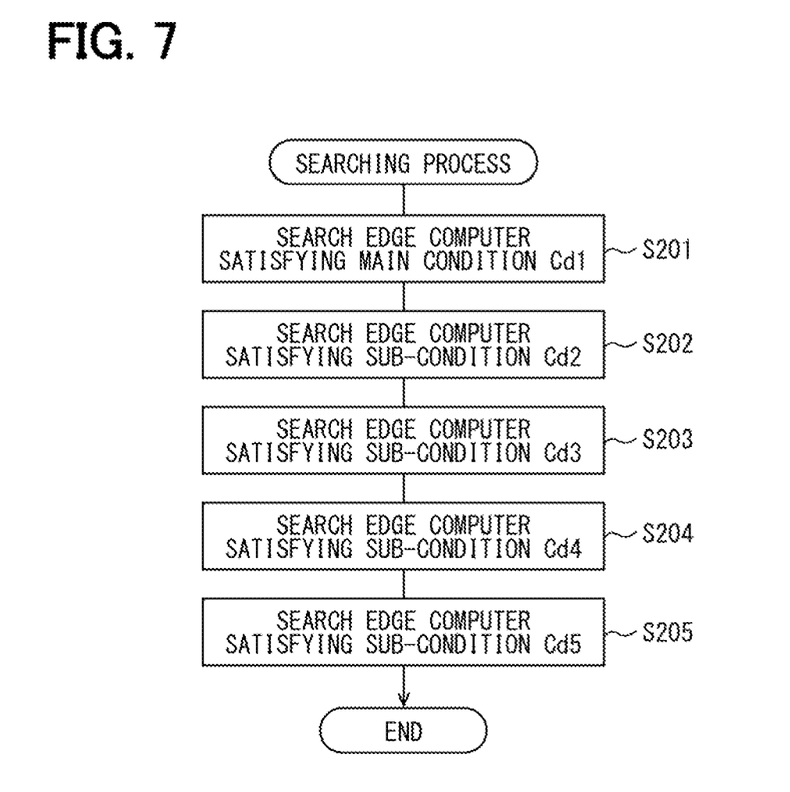
FIG. 7 is a flowchart illustrating a searching subroutine according to the embodiment.

Specifically, in S103, the searching block 110 performs the searching subroutine shown in FIG. 7. In S201 of the searching subroutine, the searching block 110 searches the edge computer 36 satisfying the main condition Cd1 for each divided data Dsd. As shown in FIG. 6, the main condition Cd1 is that the required processing capacity Ad required for the distributed processing of the divided data Dsd is at or below the processing capacity Ae of the edge computer 36. As shown in FIG. 8, the processing capacity Ae that is compared with the required processing capacity Ad is at least one of the storage capacity of the memory, the processing speed of the processor, and the communication speed. In the matching of the main condition Cd1, at least one of the communication state and the communication path may be considered as the processing capacity Ae.

As shown in FIG. 7, in S202 of the searching subroutine, the searching block 110 searches the edge computer 36 satisfying the sub-condition Cd2 from the edge computers 36 satisfying the main condition Cd1 for each divided data Dsd. As shown in FIG. 6, the sub-condition Cd2 is that the motion state of the moving body 3, on which the edge computer 36 satisfying the condition Cd1 is mounted, is in the stop state. The stop state of the moving body 3 is recognized as a state where the moving body 3 stops for a predetermined time based on the location data acquired from the edge computer 36 through the communication unit 30. The stop state of the moving body 3 may be recognized, in addition to or instead of the location data, based on at least one of the operation state of the power source, the operation state of the activation switch, the operation state of the parking brake, the charging state of the power supply unit 32 from the outside, and the time of transition to the standby mode.

As shown in FIG. 7, in S203 of the searching subroutine, the searching block 110 searches the edge computer 36 satisfying the sub-condition Cd3 from the edge computers 36 satisfying the main condition Cd1 and the sub-condition Cd2 for each divided data Dsd. As shown in FIG. 6, the first condition Cd3_$a$ of the sub-condition Cd3 is that the power state of the moving body 3 on which the edge computer 36 satisfying the conditions Cd1, Cd2 is mounted is in the charging state. The charging state is recognized based on the power supply state data acquired from the edge computer 36 through the communication unit 30. Accordingly, when the number of the edge computers 36 of the moving bodies 3 in the charging state is at or above the required number for the distributed processing of all of the divided data Dsd, the edge computers 36 satisfying the first condition Cd3_$a$ of the sub-condition Cd3 are the result of S203. That is, when the number of the searched edge computers 36 is at or above the required number, the second condition Cd3_$b$ is skipped. That is, the second condition Cd3_$b$ is omitted from the sub-condition Cd3.

In contrast, when the number of the edge computers 36 of the moving bodies 3 in the charging mode is less than the required number, the searching block 110 adds the second condition Cd3_$b$ to the sub-condition Cd3. This is to make effective use of the moving bodies 3 whose power supply unit 32 cannot be charged from the outside, and the moving bodies 3 that are not connected to the charging facilities even if the power supply unit 32 can be charged from the outside. The second condition Cd3_$b$ is that the remaining power of the power supply unit 32 of the moving body 3 on which the edge computer 36 satisfying the conditions Cd1, Cd2 is mounted is within acceptable range. The remaining power is recognized based on the power supply state data acquired from the edge computer 36 through the communication unit 30. Accordingly, the search result in S203 includes the edge computers 36 satisfying at least one of the first condition Cd3_$a$ and the second condition Cd3_$b$ of the sub-condition Cd3. The acceptable range of the remaining power of the second condition Cd3_$b$ is set to avoid the power shortage at the startup of the moving body 3, taking into account the estimated maximum amount of the power consumption by the execution of processing for each divided data Dsd.

As shown in FIG. 7, in S204 of the searching subroutine, the searching block 110 searches the edge computers 36 satisfying the sub-condition Cd4 from the edge computers 36 satisfying the main condition Cd1 and the sub-conditions Cd2, Cd3 for each divided data Dsd. As shown in FIG. 6, the sub-condition Cd4 is that the time at the area to which the moving body 3 satisfying the conditions Cd1, Cd2, Cd3 belongs is nighttime. The area to which the moving body 3 belongs is recognized based on the location data acquired from the edge computer 36 through the communication unit 30. The time of the area is recognized based on the time data acquired from the edge computer 36 through the communication unit 30, allowing worldwide time-sharing.

The nighttime of the sub-condition Cd4 may be the time between the sunset and the sunrise or the fixed time range based on the standard time of the area. In the sub-condition Cd4, the early morning time may be included in addition to the nighttime. The early morning time may be the time from sunrise until the set time elapses, or the fixed time based on the standard time of the area. The nighttime and the early morning time are the specific time when the time length in which the moving body 3 is activated is generally shorter than a reference value, or when the probability of activation of the moving body 3 generally decreases to less than a reference value.

As shown in FIG. 7, in S205 of the searching subroutine, the searching block 110 searches the edge computers 36 satisfying the sub-condition Cd5 from the edge computers 36 satisfying the main condition Cd1 and the sub-conditions Cd2, Cd3, Cd4 for each divided data Dsd. As shown in FIG. 6, the sub-condition Cd5 is that the temperature state of the moving body 3 on which the edge computer 36 satisfying the conditions Cd1, Cd2, Cd3, Cd4 is mounted is within the acceptable range. The search result by the sub-condition Cd5 in S205 may be ranked and assigned from the edge computer 36 corresponding to the moving body 3 having an advantageous temperature condition. The acceptable range of the temperature of the sub-condition Cd5 is determined such that a startup error of the moving body 3 due to excessive heat generation can be avoided. For example, the maximum heat generation temperature that is predicted to be reached by the execution of the process for each divided data Dsd is taken into consideration to determine the acceptable range.

In S104 of the processing flow shown in FIG. 4, the searching block 110 transmits the distribution request Rd as shown in FIG. 3 to the moving body 3 on which the edge computer 36 searched for each divided data Dsd is mounted. The distribution request Rd is data such as packet for requesting the distributed processing on the divided data Dsd from the host center 1 to the edge computer 36.

In S105 of the processing flow shown in FIG. 4, the searching block 110 acquires the distribution response Rr as shown in FIG. 3 from the edge computer 36 of the moving body 3 that received the distribution request Rd through the communication unit 30. In S106 of the processing flow, the searching block 110 determines whether the sign represented by the distribution response Rr acquired from the moving body 3 indicates accepted.

When it is determined in S106 that at least one distribution response Rr from the moving body 3 indicates not accepted, the processing flow returns to S103 as shown in FIG. 4. In S103 of the subroutine returned from S106, another moving body 3 is searched for the divided data Dsd that is assigned to the moving body 3 which returned the sign indicating not accepted.

Figure 9:
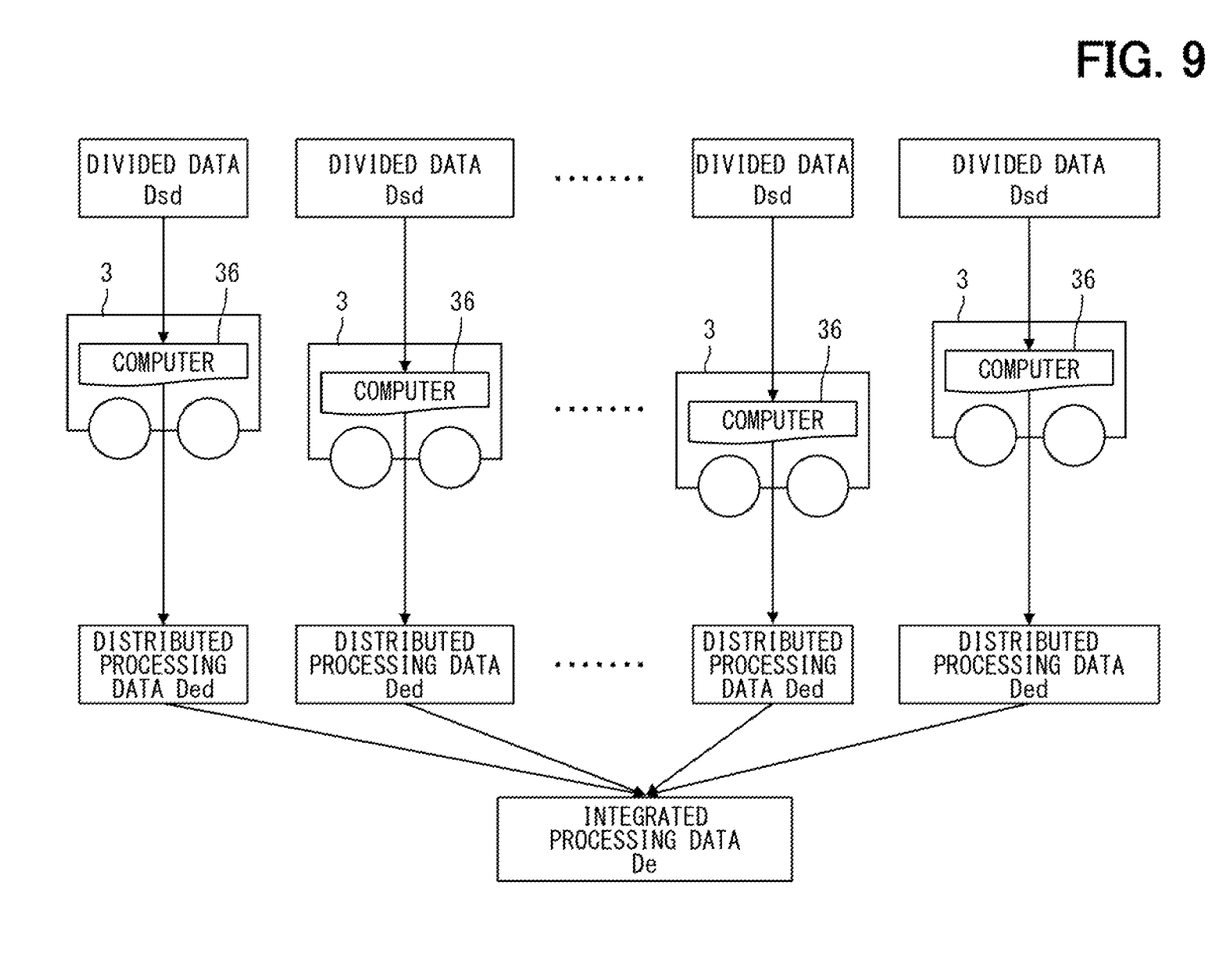
FIG. 9 is a schematic diagram for explaining distributed processing data and integrated processing data according to the embodiment.

In contrast, when it is determined in S106 that all of the distribution response Rr from the moving bodies 3 to which the distribution requests Rd are transmitted indicate the accepted sign, the processing flow proceeds to S107. In S107, the searching block 110 virtually forms the distributed processing network with the edge computers 36 that returned the distribution response Rr indicating the accepted sign. In S108 of the processing flow, the searching block 110 transmits the assigned divided data Dsd to the corresponding edge computers 36 of the moving bodies 3 forming the distributed processing network as shown in FIG. 9.

In S109 of the processing flow shown in FIG. 4, the integration block 103 acquires the distributed processing data Ded from the edge computers 36 of the moving bodies 3 forming the distributed processing network through the communication unit 30 as shown in FIG. 3. The distributed processing data Ded is data that is generated by processing the divided data Dsd by the edge computer 36 as shown in FIG. 9 and contains the processing results.

After the integration block 120 acquires the distributed processing data Ded from all of the edge computers 36 of the moving bodies 3 forming the distributed processing network, the processing flow proceeds from S109 to S110 as shown in FIG. 4. In S110, the integration block 120 integrates all of the distributed processing data Ded into the integrated processing data De as shown in FIG. 9. As shown in FIG. 4, in S111 of the processing flow, the integration block 120 transmits the generated integrated processing data De to the service center 2 as shown in FIG. 3. Then, the current execution of the processing flow ends.

According to the present embodiment described above, in the host processing by the host center 1 configured to communicate with the edge computers 36 each of which is mounted on one of the moving bodies 3, the service data set Ds related to the cloud service is divided into divided data. In the host processing, the matching of the distribution necessary conditions Cd required for the distribution processing of the divided data Dsd is monitored for each edge computer 36, and then the edge computers 36 satisfying the distribution necessary conditions Cd are searched. According to this host processing, the computer mounted on the moving body 3 is virtually utilized as the edge computer 36. Accordingly, the network for the distributed processing can be expanded or contracted according to the size of the service data set Ds, and the capital investment can be reduced.

(Other Embodiments)

Although one embodiment has been described, the present disclosure should not be limited to the above embodiment and may be applied to various other embodiments within the scope of the present disclosure.

The edge computer 36 of a modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In the modification example, at least a part of the functions of the service center 2 may be performed by the host center 1. In a modification example where all functions of the service center 2 are realized by the host center 1, S101 executed by the dividing block 100 and the S111 executed by the searching block 110 may be omitted.

In a modification example, in S103 executed by the searching block 110, the order of S202, S203, S204, S205 may be changed. In a modification example, in S103 executed by the searching block 110, at least one of S202, S203, S204, S205 may be omitted. That is, the search based on at least one of the sub-conditions Cd2, Cd3, Cd4, Cd5 may not be executed. In a modification example, in S203 of S103 executed by the searching block 110, the search based on the first condition Cd3_a or the second condition Cd3_b may be omitted.

In a modification example, S107 and S108 executed by the searching block 110 and S109, S110, S111 executed by the integration block 120 may be executed by the service center 2. In this case, the service data set Ds may not be transmitted from the service center 2 to the host center 1, and the result of searching the edge computer 36 may be transmitted from the host center 1 to the service center 2. According to this, the divided data Dsd may be transmitted from the service center 2 to the moving body 3 that transmitted the accepted sign, and the distributed processing data Ded may be transmitted from the moving body 3 to the service center 2.

What is claimed is:

1. A processing system in a host center configured to communicate with a plurality of edge computers each of which is mounted on one of a plurality of moving bodies, the processing system being configured to perform host processing on a service data set related to a cloud service, the processing system comprising a processor configured to:
   divide the service data set into a plurality of divided data sets, each divided data set of the plurality of divided data sets having an associated required processing capacity based on a data size and processing deadline of the divided data set;
   search the plurality of edge computers to identify each edge computer that satisfies a main condition and a first condition, main condition being that the edge computer has a processing capacity that is greater than the associated required processing capacity for one of the divided data sets of the plurality of divided data sets and the first condition being that the moving body on which the edge computer is mounted is being charged with electric power;
   determine a number of edge computers that satisfy both the main condition and the first condition;
   determine whether the number of edge computers that satisfy both the main condition and the first condition is sufficient to process all of the plurality of divided data sets;
   in response to determining that the number of edge computers that satisfy both the main condition and the first condition is sufficient to process all of the plurality of divided data sets, transmit the plurality of divided data sets to the edge computers that satisfy both the main condition and the first condition;
   in response to determining that the number of edge computers that satisfy the main condition and the first condition is not sufficient to process all of the plurality of divided data sets, search the plurality of edge computers to identify each edge computer that satisfies a main condition and a second condition, the second condition being that a remaining power of the moving body on which the edge computer is mounted is within an acceptable range;
   determine a number of edge computers that satisfy both the main condition and the second condition;
   determine whether the number of edge computers that satisfy both the main condition and the first condition and the number of edge computers that satisfy both the main condition and the second condition is sufficient to process all of the plurality of divided data sets; and
   in response to determining that the number of edge computers that satisfy both the main condition and the first condition and the number of edge computers that satisfy both the main condition and the second condition is sufficient to process all of the plurality of divided data sets, transmit the plurality of divided data sets to the edge computers that satisfy both the main condition and the first condition and the edge computers that satisfy both the main condition and the second condition.

2. The processing system according to claim 1, wherein the first condition further includes that a motion state of the moving body on which the edge computer is mounted is a stop state.

3. The processing system according to claim 1, wherein the first condition further includes that a time of a time zone, where the moving body on which the edge computer is mounted belongs to, is nighttime.

4. The processing system according to claim 1, wherein the first condition further includes that a temperature state of the moving body on which the edge computer is mounted is within an acceptable range.

5. The processing system according to claim 1, wherein the processor is configured to divide the service data set in response to a processing request transmitting to the host center from a service center providing the cloud service.

6. The processing system according to claim 1, wherein the processor is further configured to integrate, into integration data, distributed processing data each of which is generated by performing the distribution processing on the divided data by the edge computer searched for each of the divided data.

7. A processing method for performing host processing on a service data set related to a cloud service in a host center configured to communicate with a plurality of edge computers each of which is mounted on one of a plurality of moving bodies, the processing method comprising:
   dividing the service data set into a plurality of divided data sets, each divided data set of the plurality of divided data sets having an associated required processing capacity based on a data size and processing deadline of the divided data set;
   searching the plurality of edge computers to identify each edge computer that satisfies a main condition and a first condition, main condition being that the edge computer has a processing capacity that is greater than the associated required processing capacity for one of the divided data sets of the plurality of divided data sets and the first condition being that the moving body on which the edge computer is mounted is being charged with electric power;
   determine a number of edge computers that satisfy both the main condition and the first condition;
   determine whether the number of edge computers that satisfy both the main condition and the first condition is sufficient to process all of the plurality of divided data sets;
   in response to determining that the number of edge computers that satisfy both the main condition and the first condition is sufficient to process all of the plurality of divided data sets, transmit the plurality of divided data sets to the edge computers that satisfy both the main condition and the first condition;
   in response to determining that the number of edge computers that satisfy the main condition and the first condition is not sufficient to process all of the plurality of divided data sets, search the plurality of edge computers to identify each edge computer that satisfies a main condition and a second condition, the second condition being that a remaining power of the moving body on which the edge computer is mounted is within an acceptable range;

determine a number of edge computers that satisfy both the main condition and the second condition;

determine whether the number of edge computers that satisfy both the main condition and the first condition and the number of edge computers that satisfy both the main condition and the second condition is sufficient to process all of the plurality of divided data sets; and in response to determining that the number of edge computers that satisfy both the main condition and the first condition and the number of edge computers that satisfy both the main condition and the second condition is sufficient to process all of the plurality of divided data sets, transmit the plurality of divided data sets to the edge computers that satisfy both the main condition and the first condition and the edge computers that satisfy both the main condition and the second condition.

8. A non-transitory computer readable medium storing a computer program product for performing host processing on a service data set related to a cloud service in a host center configured to communicate with a plurality of edge computers each of which is mounted on one of a plurality of moving bodies, the computer program product comprising instructions configured to, when executed by at least one processor, cause the at least one processor to:

divide the service data set into a plurality of divided data sets, each divided data set of the plurality of divided data sets having an associated required processing capacity based on a data size and processing deadline of the divided data set;

search the plurality of edge computers to identify each edge computer that satisfies a main condition and a first condition, main condition being that the edge computer has a processing capacity that is greater than the associated required processing capacity for one of the divided data sets of the plurality of divided data sets and the first condition being that the moving body on which the edge computer is mounted is being charged with electric power;

determine a number of edge computers that satisfy both the main condition and the first condition;

determine whether the number of edge computers that satisfy both the main condition and the first condition is sufficient to process all of the plurality of divided data sets;

in response to determining that the number of edge computers that satisfy both the main condition and the first condition is sufficient to process all of the plurality of divided data sets, transmit the plurality of divided data sets to the edge computers that satisfy both the main condition and the first condition;

in response to determining that the number of edge computers that satisfy the main condition and the first condition is not sufficient to process all of the plurality of divided data sets, search the plurality of edge computers to identify each edge computer that satisfies a main condition and a second condition, the second condition being that a remaining power of the moving body on which the edge computer is mounted is within an acceptable range;

determine a number of edge computers that satisfy both the main condition and the second condition;

determine whether the number of edge computers that satisfy both the main condition and the first condition and the number of edge computers that satisfy both the main condition and the second condition is sufficient to process all of the plurality of divided data sets; and in response to determining that the number of edge computers that satisfy both the main condition and the first condition and the number of edge computers that satisfy both the main condition and the second condition is sufficient to process all of the plurality of divided data sets, transmit the plurality of divided data sets to the edge computers that satisfy both the main condition and the first condition and the edge computers that satisfy both the main condition and the second condition.

* * * * *